United States Patent

Molner

[15] 3,684,355

[45] Aug. 15, 1972

[54] GLARE SUSCEPTIBILITY TESTER

[72] Inventor: Stanley F. Molner, Cambridge, Mass.

[73] Assignee: Biometrics, Inc., Cambridge, Mass.

[22] Filed: July 2, 1970

[21] Appl. No.: 51,826

Related U.S. Application Data

[63] Continuation-in-part of Ser. No. 805,541, March 10, 1969, abandoned.

[52] U.S. Cl. ..........................351/36, 351/1, 351/30, 351/39
[51] Int. Cl. ..............................................A61b 3/06
[58] Field of Search........................351/1, 30, 36, 39

[56] References Cited

UNITED STATES PATENTS

| | | | |
|---|---|---|---|
| 1,437,809 | 12/1922 | Jones | 351/1 X |
| 2,209,728 | 7/1940 | Higley | 351/36 X |
| 2,234,240 | 3/1941 | Frohring et al. | 351/36 |
| 3,341,275 | 9/1967 | Haugen | 351/36 X |
| 3,355,237 | 11/1967 | Simpson | 351/36 X |
| 3,415,594 | 12/1968 | Aulhorn | 351/30 |
| 3,424,519 | 1/1969 | White | 351/1 X |
| 3,425,772 | 2/1969 | Minas | 351/39 |
| 3,436,146 | 4/1969 | Minas | 351/1 |

OTHER PUBLICATIONS

J. Blanchard, " The Brightness Sensibility of the Retina," The Physical Review, 2nd Series, Vol. XI, No. 2, February 1918, pps. 81– 99

L. Holladay, " The Fundamentals of Glare & Visibility," JOSA & Review of Scientific Instruments, Vol. 12, No. 4, April 1926, pps. 271– 319

M. Luckiesh et al., " A Visual Thresholdometer," JOSA, Vol. 24, November 1934, pps. 305– 307

*Primary Examiner*—John K. Corbin
*Assistant Examiner*—Paul A. Sacher
*Attorney*—Wolf, Greenfield and Sacks

[57] ABSTRACT

A method and apparatus for testing the glare susceptibility of a subject. The technique includes presentation of a glare source and a target to the subject's view and then varying the relative intensity of light emitted by the glare source and target to determine the subject's susceptibility to glare. In each of the testing devices disclosed herein, means are provided for varying the target image to present a different, indentifiable target to the subject. The relative intensity of glare in relation to the intensity of the target illumination may be controlled by varying the intensity of the target while maintaining the glare intensity constant, varying the glare intensity while maintaining the intensity of the target or a combination of both.

9 Claims, 5 Drawing Figures

PATENTED AUG 15 1972

INVENTOR.
STANLEY F. MOLNER

BY Wolf, Greenfield, Hieken & Sacks

ATTORNEYS

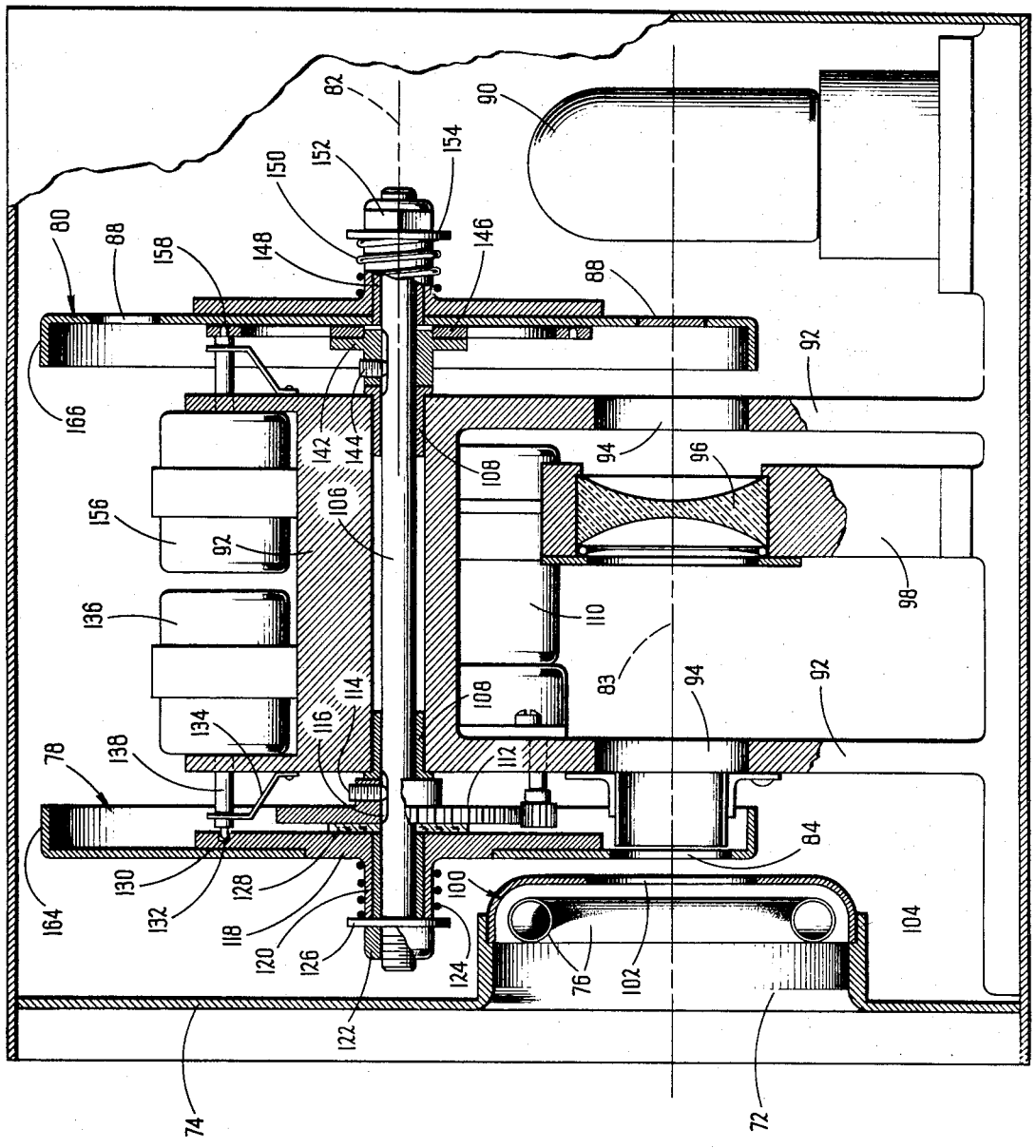

3,684,355

GLARE SUSCEPTIBILITY TESTER

BACKGROUND OF THE INVENTION

This is a continuation in part of U.S. Patent Application Ser. No. 805,541, filed Mar. 10, 1969, now abandoned.

This invention relates to techniques for measuring a subject's glare sensitivity. Interest in glare sensitivity as a diagnostic for visual and neurological problems, as a measure of the quality of fit of contact lenses, and as a requirement for automobile driver licensing tests is used with increasing frequency and the principal object of this invention is to provide a method and apparatus adapted to permit a person's sensitivity and susceptibility to glare to be reliably determined.

At the present time, ophthalmologists and optometrists determine sensitivity to glare subjectively. The doctor typically makes his determination by shining a small flashlight in the patient's eye and making a skilled judgement as to whether the patient is more or less sensitive to glare than most other people he has tested. It is among the primary objects of the invention to provide a method and apparatus for testing a subjects' glare susceptibility which does not require that the test be administered by a trained, skilled ophthalmologist. The technique may be employed by less skilled persons such as optometrists, technicians, medical assistants or others who have been trained to operate the relatively simple testing device.

SUMMARY OF THE INVENTION

To accomplish the objects of the invention, the glare susceptibility tester performs its function by making measurement of the loss of visual acuity under conditions in which the degree of glare can be sensitively and repeatably varied.

In one embodiment of the invention, a constant color-temperature light source is provided and serves as the glare source. The intensity of the glare source is adjustable from zero to essentially full intensity. The light source shines into the eyes of the subject while a series of standard targets are sequentially presented to the subject's view. The targets are presented in a sequence of different attitudes or orientations and he is asked to identify the change in orientation of the target under variable glare conditions.

In another embodiment of the invention, the glare source is maintained at a constant intensity throughout the test. The targets, however, are presented to the subject under varying degrees of illumination and he is requested to identify the changing target as the intensity of its illumination changes in relation to the fixed intensity of the glare source.

It is among the primary objects of the invention to provide an improved, simplified, technique for testing the glare susceptibility of a subject.

A further object of the invention is to provide a technique for testing the glare susceptibility of a subject which does not require the skilled subjected judgement of an ophthalmologist or other highly trained person and which also provides a standardized measure of glare susceptibility.

A further object of the invention is to provide a method and apparatus for testing a subject's glare susceptibility which is suitable for use particularly in mass testings of large numbers of subjects.

DESCRIPTION OF THE DRAWINGS

These and other objects and features of this invention along with its incident advantages will be better understood and appreciated from the following detailed description of the preferred embodiments thereof, selected for purposes of illustration and shown in the accompanying drawings, in which:

FIG. 5 is a side elevation, partly in section of the device shown in FIG. 4 as seen along the line 5—5 of FIG. 4.

DESCRIPTION OF THE PREFERRED EMBODIMENT

Figure 1:
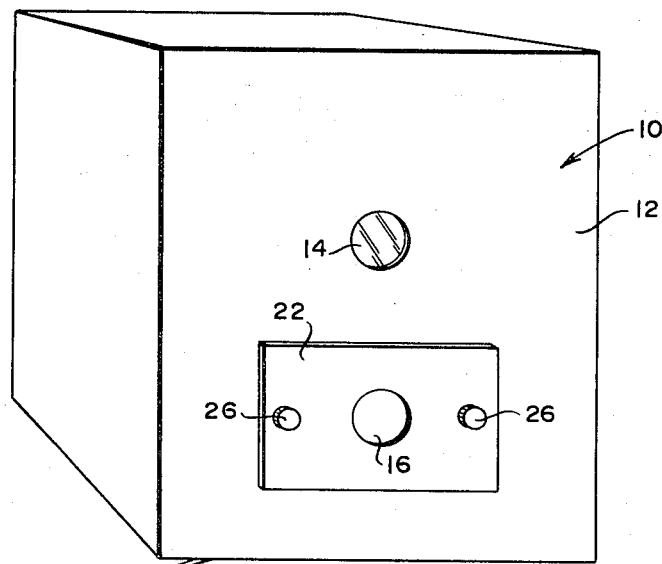
FIG. 1 is a perspective view showing a glare sensitivity tester constructed in accordance with this invention.

The glare testing device of this invention is embodied in a housing 10 having a front panel 12 provided with a glare source opening 14 and a target opening 16. The tester also includes a remote control box 18 connected to the main housing 10 by cord 20. In FIG. 1, the target opening 16 is shown formed in a plate 22 that forms the front wall of a removable target cassette 24 shown separately in FIG. 3, held in place by a pair of fasteners 26. Within the housing 10 are generally three systems, namely, glare source 28, target presentation section 30, and control section 32.

The glare source 28 includes a lamp 34 that may take the form of a standard incandescent projection lamp or some other form which produces a sufficient quantity of light. A condensor 36 mounted in the housing between the lamp 34 and the glare source opening 14 directs light from the lamp through the opening and to the subject's eye, represented at 38 in FIG. 2. A variable density filter 40 in the form of a film loop interrupts the light between condensor 36 and opening 14. The variable density film is used to vary the intensity of the glare directed at the subject.

The film strip 40 is provided with approximately twenty discreet density areas 40a from essentially opaque to essentially clear, so that the intensity of the glare may be changed from zero to effectively full light source intensity. Merely by moving the film strip so that the discreet areas are sequentially placed between the condensor and the opening 14 the glare directed at the subject may be varied.

Figure 3:
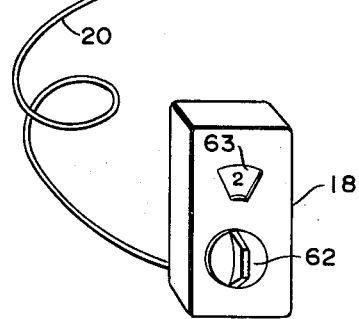
FIG. 3 is a perspective view of the target cassette used in the tester of FIG. 1.
Figure 3:
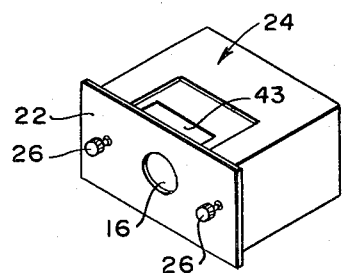

The target presentation section 30 includes a second film strip 42 which carries a number of standard targets 44 in random order. The targets typically may be Landolt Rings, "Es" etc. which the subject is asked to identify as the test is conducted. In this embodiment, a light pipe 46 may be employed to conduct light from the lamp 34 to illuminate the background for the target film 42 so that the targets may be viewed through the opening 16 as each is brought into alignment with the opening. Preferably the target film strip 42 is packaged in a cassette as suggested in FIG. 3 which may carry the film in a loop or on reels so that it may be advanced step by step by the target opening 16. The cassette arrangement allows for a fast and simple interchange of the types and sizes of targets to suit the particular subject. In the form shown, the cassette may be quickly removed and replaced by means of the fasteners 26. The cassette in FIG. 3 is shown to carry a target background filter 43 which determines the color and/or intensity of the background of the target viewed through the opening 16. Thus, glare susceptibility with variations in color also may be tested by using filters of different color in the cassette.

Figure 2:
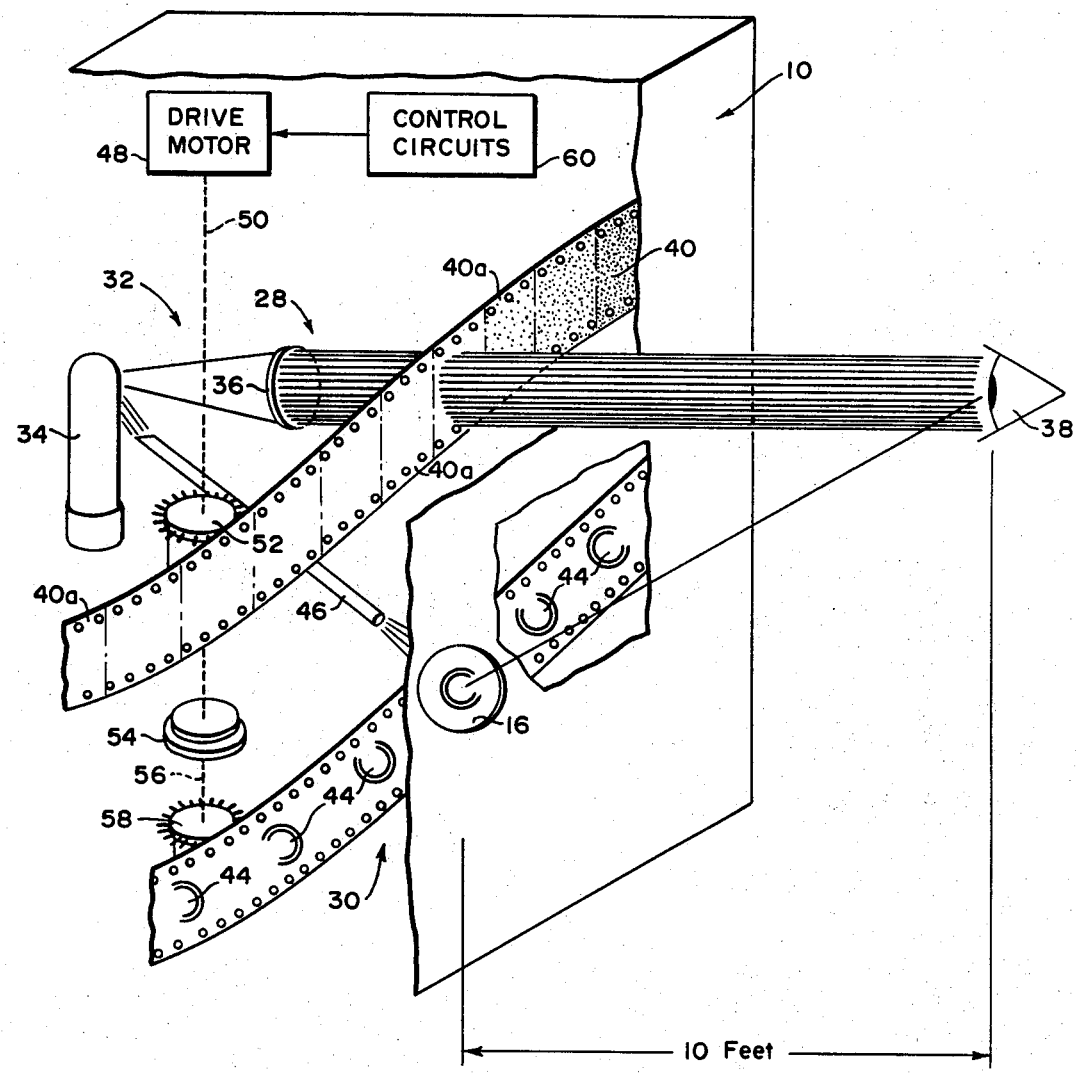
FIG. 2 is a diagrammatic illustration showing the interior of the tester of FIG. 1 and its mode of operation.

The drive control 32 suggested schematically in FIG. 2 includes a drive motor 48 carrying a shaft 50 which in turn bears sprocket assembly 52 for moving the variable density strip 40 of the glare source 28. The end of the shaft 50 is connected by means of a one-way clutch 54 to a second shaft 56, which carries a second drive sprocket assembly 58 for moving the target strip 42 of the target presentation section 30. A control circuit is represented by box 60, which circuit includes the control 18 and cable 20. The sprocket assembly may project through an opening in the cassette 24 to engage the target strip if in fact the strip is contained in such a cassette, or alternatively, the shaft 56 may engage the sprocket assembly 58 which itself is contained within the cassette.

In the foregoing embodiment, with each forward actuation of the switch 62 on control box 18, both the strips 40 and 42 advance one step, and the indicator 63 on the box 18 identifies the particular frame of the strip 40 intercepting the light from lamp 34. When the actuation of the switch 62 is the forward direction, the strip 40 moves so as to increase the intensity of the glare one step. When the examiner actuates the switch 62 in the reverse direction, the one-way clutch 54 prevents the strip 42 from moving so as to leave the target unchanged, but the glare intensity is reduced. This arrangement allows the examiner to gradually reduce the brightness of the glare source until the subject can identify the orientation of the particular target exposed through the viewing opening 16. In a second operating mode, forward steps decrease the glare intensity, and the examiner runs the device forward until the subject is able to correctly identify the target orientation. Thereafter, the examiner retests the end point by reversing one or two steps, requiring the subject to determine the target orientation again. In use, the examiner normally stands beside the subject and the cable 20 allows him to assume this position and operate the glare tester remotely. By standing beside the subject but out of range of the glare source, the examiner can identify the target in the viewing opening 16 and at the same time, he can advance or reverse the variable density filter strip.

While in the foregoing embodiment, the variable targets are carried on separate frames on the film strip within the cassette, it will be apparent that the variable target may be created by a fixed film with a single image, and the size of the target may be changed by a lens system between the film and subject. Moreover, the color and/or intensity of the background may be changed by placing suitable filters between the film and subject.

It will also be appreciated that the glare source opening and the target opening can be the same opening. In this embodiment, the target film strip is disposed between the variable density strip and the subject. In this arrangement, there is only one fixation area to which to direct the subject's attention.

Figure 4:
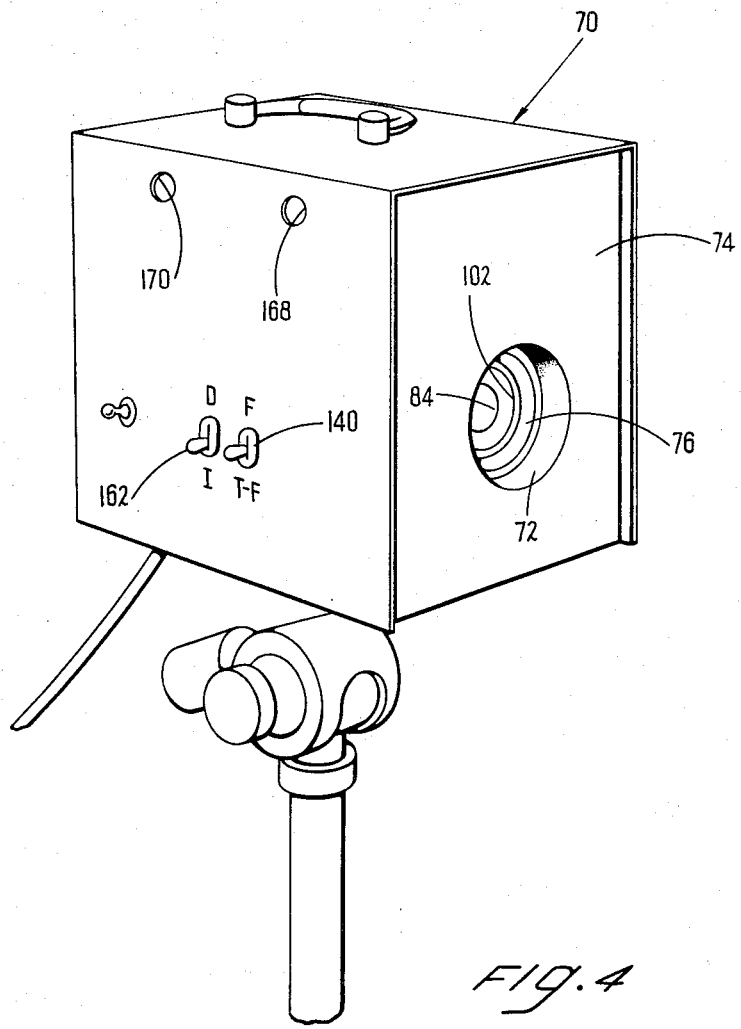
FIG. 4 is a perspective view of another embodiment of the testing device partly broken away.

FIGS. 4 and 5 show another embodiment of the invention in which the glare source and target are disposed in the same region with the glare source preferably surrounding the target. This embodiment of the invention includes a housing 70 having a circular opening 72 formed in its front face 74. The subject faces the front face 74 of the device so that he may direct his view through the opening 72. The image which is presented to the subject through the opening 72 includes a central identifiable target and a surrounding glare ring 76. As described below, the relative intensity of the glare ring and the target illumination are varied in a controlled manner to test the subject's glare susceptibility under varying conditions.

In this embodiment of the invention, the device includes a target wheel 78 and a filter wheel 80 which are rotatable through the optical axis 83 of the device about a fixed axis 82.

The target wheel 78 carries a plurality of circumferentially spaced targets 84 mounted on transparent film or plate. As the target wheel is rotatably indexed, the targets 84 are presented to the optical axis which also passes centrally through the glare ring 76. The filter wheel 80 includes a plurality of circumferentially spaced neutral density filters 88 of different densities which may be rotated into the alignment with the optical axis to vary the degree of illumination of the target. Illumination is provided by an appropriate incandescent bulb 90 supported rearwardly within the housing 70 along the optical axis 83. The filter and target wheels are supported by a bracket 92 which has openings 94 formed in at least those portions which are disposed along the optical axis 83. The openings permit the light to pass unobstructed along the optical axis and through the opening 72 in the front face 74 of the housing 70. The device also includes a collimating lens 96 along the optical axis 83 and behind the target wheel 78. As shown, the collimating lens 96 may be mounted on a lens support 98 which may be formed integrally with or secured to the bracket 92.

The target image presented to the subject is framed by an annular glare ring shield 100 which is supported within the housing between the glare ring 76 and the target wheel 78. The shield 100 preferably is mounted to the removable front panel 74. The shield 100 has a central opening 102 in alignment with the optical axis 83 and also includes a forwardly extending peripheral flange 104 which embraces the periphery of the glare ring 76. The forwardly facing surface of the shield 100 preferably is painted or otherwise coated with a white light-diffusive surface to reflect a major portion of the light from the glare ring back toward the subject. Thus, the image presented to the subject consists of a central target 86, illuminated to an intensity dependent on the selection of the filter 88 on the filter wheel 80, with the target being surrounded by a ring of relatively intense light. As described more fully below, the filter wheel and target wheel are rotated to various positions to conduct the tests.

The target and filter wheels 78, 80 are supported near the ends of a shaft 106 which is supported, between its ends, at the upper end of the bracket 92 by bearings 108. The shaft 106 is driven continuously by the motor 110 which is supported on the bracket 92. The motor 110 is connected to a drive gear 112 which is secured to the shaft 106 by a conventional set screw 114 engagable with a flat 116 on the shaft 106.

The target wheel 78 is secured to a hub member 118 which, in turn, is rotatably journaled about the forward end of the shaft 106 by the cylindrical bearing 120. The hub 118 and target wheel 78 are retained on the forward end of the shaft 106 by a hand nut 122 which screws onto the shaft 106. The hub 118 and target wheel 78 are biased rearwardly toward the drive gear 112 by a compression spring 124 retained in place by the washer 126. A friction pad 128 which may be formed from felt or other appropriate material is disposed between the facing surfaces of the drive gear 112 and hub 118. In the absence of any force tending to restrain rotation of the target wheel, the target wheel 78 will rotate in unison with the shaft 106 and drive gear 112.

The foregoing drive arrangement for the target wheel 78 defines a slip clutch which is employed to index the target wheel to position a selected target 86 along the optical axis 83. Indexing is accomplished by providing a plurality of circumferentially spaced holes 130 at the rearward face of the hub 118 for engagement with a spring biased detent 132. The detent 132 is mounted on a leaf spring 134, also is supported on the bracket 92 which biases the detent 132 forwardly toward the holes 130 in the hub 118. Thus, the detent 132 normally will be in engagement with one of the holes 130 in the hub 118 to restrain motion of the target wheel 78 with the rotating shaft 106. The holes 130 are positioned in relation to the targets 86 so that when the detent 132 engages one of the holes 130, a corresponding target will be disposed along the optical axis 83. In order to rotate and index the target wheel to present a new target to the subject, the detent 132 is withdrawn momentarily to release the hub 118 which then is rotated by the frictional engagement of the rotating friction pad 128. As soon as the next hole 130 rotates into engagement with the detent 132, the target wheel 78 is restrained with the corresponding target being exposed to the subject's view. The detent 132 is retracted from engagement with the hub 118 by a target wheel solenoid 136 supported on the bracket 92 and having a retractable plunger 138 connected to the leaf spring 134. The target wheel solenoid is operated by a conventional switch 140 which is accessible externally of the housing 70.

The filter wheel 80 is mounted to the other, rearward end of the shaft 106 by a similar slip clutch. This arrangement includes a hub 142 which is secured about the rearward end of the shaft 106 by a set screw 144 in engagement with a flat on the shaft. The rearward face of the hub 142 includes a circular felt pad 146 which bears against the facing surface of the filter wheel 80. The filter wheel 80 is rotatably mounted to the rear end of the shaft 106 by a cylindrical bearing 148. The filter wheel is biased toward and into engagement with the felt pad 146 by a compression spring 150 which is retained in place together with the filter wheel 80 by a nut 152 and washer 154 secured to the end of the shaft 106. Because of the engagement of the felt pad 146 with the filter wheel 80, the filter wheel will tend to rotate in unison with the shaft 106 and the target wheel 78. Rotation of the filter wheel may be interrupted, to position a selected one of the neutral density filters 88 along the optical axis of the device by a filter wheel solenoid 156 which operates similarly to the solenoid 136 associated with the target wheel 78. The filter wheel solenoid 156 also controls the retraction of a detent 158 from the circumferentially spaced holes formed on the filter wheel 80. Operation of the filter wheel solenoid 156 and, therefore, indexing of the filter wheel is controlled by the switch 140 which also controls operation of the target wheel solenoid 136 as described above.

The device is operated by a pair of simple control switches 140, 162 which preferably are located at the side of the housing 70 to provide convenient access for the operator. The switch 140, described above, is employed to actuate either the filter solenoid individually or both the filter and target solenoid 136, 156 simultaneously, depending on which position the switch is thrown to from the neutral position shown. For example, when the switch is pressed upwardly toward the position indicated at F, only the filter wheel solenoid will be actuated to permit the filter wheel to rotate with the shaft until the switch is released to deactivate the solenoid and permit its detent 158 to enter the next presented hole 160 in the filter wheel. This permits the target to remain the same while varying the intensity of target illumination. When the switch 140 is depressed to the T-F position, both solenoids 136, and 156 are actuated to cause both the target itself and the filter to change.

In the preferred embodiment of the invention, the drive motor 110 is of the reversible type to enable the shaft and its associated wheels to be rotated in either direction. This permits the filter wheel to be turned to selectively increase or decrease the illumination of the target. The direction of rotation of the wheels 78, 80 is controlled by the switch 162 which controls the polarity of the reversible motor 110. For example, when in the "I" position shown, the switch 162 will cause the filter wheel 80 to be rotated in a direction tending to increase the target illumination. When in the opposite position "D" the direction of rotation of the shaft 106 and filter wheel 80 is reversed to decrease the target wheel illumination.

In order to monitor the target and target illumination intensity presented to the subject, appropriate indicators are associated with each of the wheels 78, 80. In the embodiment shown, this is achieved by forming flanges 164, 166 about the circumference of the target wheel 78 and filter wheel 80 respectively. Appropriate markings corresponding to the various target configurations and filter densities are spaced circumferentially about the flanges 164, 166. Windows 168, 170 are formed in one of the walls of the housing to expose the calibrated flanges 164, 166 of the wheel 78, 80. The calibrations are disposed on the wheel so that when a given calibration is viewed through either of the windows 168, 170 the particular target or filter associated with that calibration will be disposed along the optical axis 83 and presented to the subject being tested.

A variety of testing techniques may be employed with the device to test the subject's glare susceptibility. With the glare ring turned on, the filter wheel 80 is rotated to present the least dense filter to the optical axis thus illuminating the target to its maximum intensity. The subject is asked to indicate the target attitude, such as if the opening in the Landolt ring is facing up, down, right or left. The Examiner may verify the subject's response by observing the indicia in the target indicator window 168. The examiner then momentarily depresses the switch 140 to the T–F position to index both the target wheel and filter wheel one increment, thus presenting a different target illuminated at a decreased intensity. The subject then is again asked the attitude of the target. This procedure is continued until the glare of the glare ring is so intense in relation to the target illumination that the subject no longer can perceive the target attitude. The examiner than notes the indicia appearing in the filter window thus providing a quantitative value of the subject's glare susceptibility. The examiner may then elect to extinguish the glare ring and continue to reduce the background illumination of the target until the subject can no longer perceive the target orientation. This second end point provides a measure of the subject's visual acuity without glare.

Another testing technique may be employed to determine the subject's glare recovery period. This technique includes progressively reducing the target background illumination by incremental rotation of the filter wheel until the subject no longer can identify the target orientation. The glare source then is extinguished. The time lapse from extinguishment of the glare source until the subject is able to identify the target orientation is the glare recovery period.

When conducting tests, the unit preferably should be positioned so that the subject may look directly at the target while comfortably seated at a distance of approximately 10 feet. The room should be darkened or at least dimmed as a brightly lit room makes reliable measurements somewhat difficult. The subject's eyes may be tested simultaneously or individually by employing a conventional occluder or eye patch.

If desired, the target wheel 78 may be changed. Different target wheels corresponding to different degrees of visual acuity or different target configurations or different forms of targets may be employed. In order to remove or change the target wheel 78, the front panel preferably is removable to provide access to the hand nut which is unscrewed simply to permit replacement of the target wheel.

Thus, I have described an improved method and apparatus for testing various visual perameters and, more particularly, that of a subject's glare susceptibility. Moreover, the technique is suited particularly for use by examiners who need not have had the skill and training necessary to perform such tests according to previous techniques. It should be understood, however, that other modifications and embodiments of the invention will be apparent to those skilled in the art without departing from its spirit.

Having thus described the invention, what is claimed is:

1. A glare susceptibility testing device comprising:
   target means disposed within said device;
   means for illuminating said target means;
   a glare source comprising a generally annular light source disposed in said device and being arranged to surround the image of said target as presented to the subject;
   means for varying the intensity of illumination of said target means whereby the relative intensity of said annular glare source and said target may be controlled; and
   means for shielding said target means from glare emitted by said glare source.

2. A device as defined in claim 1 wherein said shielding means comprises:
   a ring having a central opening formed therein, said opening being adapted to permit the subject to view the target image framed within said opening;
   said ring having an outer flange surrounding said annular glare source for reflecting light from said glare source away from said target.

3. A device as defined in claim 1 wherein said means for varying the degree of illumination of said target comprises:
   a plurality of filters of different optical densities; and
   means mounting said filters for sequential movement into the light path defined between said target and said illuminating means therefor.

4. A device as defined in claim 3 wherein said means adapting said target to present said changing image comprises:
   a plurality of different targets for sequential movement into the optical path defined by said filtered illuminating light and in central registry with said annular glare source.

5. A glare susceptibility testing device comprising:
   target means disposed within said device;
   means for illuminating said target means;
   a glare source comprising a generally annular light source disposed in said device and being arranged to surround the image of said target as presented to the subject;
   means for varying the intensity of illumination of said target means whereby the relative intensity of said annular glare source and said target may be controlled;
   means mounting said targets for movement and wherein said means mounting said targets for said movement further comprises;
   a shaft rotatable the fixed axis;
   said plurality of targets being mounted to a wheel in a circumferentially spaced arrangement;
   said plurality of filters being mounted to another wheel in circumferentially spaced arrangement thereon;
   means mounting said wheels to said shaft in spaced relation along said shaft;
   means for driving said shaft, said shaft and said wheels being arranged to present selected filters and targets into alignment with the central axis of said glare ring; and
   said means for illuminating said target comprising a light source on the side of said filter wheel which is remote from said target, said light and said central axis of said glare ring defining the optical axis of said device;
   said drive means for driving said shaft being reversable whereby said filters and said targets may be presented in reversed sequence;
   means mounting said filter wheel and said target wheel in said shaft for relative and unitary rotary motion with said shaft; and control means associated with said wheels for permitting or precluding said wheels to rotate in unison with said shaft.

6. A device as defined in claim 5 further comprising:
said means for driving said shaft being reversable to permit said filters and targets to be presented in a reversed sequence.

7. A device as defined in claim 5 wherein said control means for permitting or precluding said filter wheels to rotate in unison with said shaft comprises:
detent means associated with each of said wheels, said detent means being adapted to engage each of said wheels to preclude rotation of said wheels, said detent means being releasable to permit said rotation, said detent means being operable independently or in unison with each other.

8. A method of testing a subject's glare susceptibility comprising the steps of:
presenting to the subject a target to be viewed;
presenting a glare source of a generally annular configuration surrounding said target image as viewed by the subject;
maintaining said glare source at an intensity relative to that of said target to prevent the subject from identifying the target;
thereafter discreetly reducing the relative intensity of the glare to that of the target and simultaneously and incrementally changing the target image until the target can be identified by the subject; and
shielding said target means from glare emitted by said glare source.

9. A method of testing a subject's glare susceptibility as defined in claim 8 wherein said step of reducing the relative intensity of the glare to that of the target comprises maintaining the glare source at a constant intensity and increasing the degree to which said target is illuminated.

* * * * *